(12) United States Patent
Beaurepaire et al.

(10) Patent No.: US 12,050,108 B2
(45) Date of Patent: Jul. 30, 2024

(54) METHOD AND APPARATUS FOR DETERMINING ROAD DEBRIS INDICATORS

(71) Applicant: HERE GLOBAL B.V., Eindhoven (NL)

(72) Inventors: Jerome Beaurepaire, Nantes (FR); Leon Stenneth, Chicago, IL (US); Jeremy Michael Young, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 246 days.

(21) Appl. No.: 17/875,160

(22) Filed: Jul. 27, 2022

(65) Prior Publication Data
US 2024/0035834 A1 Feb. 1, 2024

(51) Int. Cl.
G06V 20/58 (2022.01)
G01C 21/00 (2006.01)
G01C 21/34 (2006.01)
G06V 10/764 (2022.01)

(52) U.S. Cl.
CPC ..... *G01C 21/3461* (2013.01); *G01C 21/3807* (2020.08); *G01C 21/3841* (2020.08); *G06V 10/764* (2022.01); *G06V 20/58* (2022.01)

(58) Field of Classification Search
CPC ............ G01C 21/3461; G01C 21/3841; G01C 21/3807; G06V 20/58; G06V 10/764
See application file for complete search history.

(56) References Cited

U.S. PATENT DOCUMENTS 11,119,477 B1 9/2021 Konrardy et al.

OTHER PUBLICATIONS

Zhengjing, et al., "Deep Learning for Geological Hazards Analysis: Data, Models, Applications, and Opportunities," School of Engineering and Technology, China University of Geosciences (Beijing), Earth-Science Reviews 223 (2021) 103858 (33 pgs.).

*Primary Examiner* — Mathew Franklin Gordon
(74) *Attorney, Agent, or Firm* — Jeffrey R. Moisan; HERE GLOBAL B.V.

(57) ABSTRACT

A method, apparatus, and user interface for road debris detection comprising, in some embodiments, obtaining image data of at least one navigable link and/or road debris, determining a road debris indicator based on the obtained image data, wherein the road debris indicator includes road debris classification data, and associating the determined road debris indicator with one or more navigable links to update a map layer of a geographic database.

20 Claims, 8 Drawing Sheets

METHOD AND APPARATUS FOR DETERMINING ROAD DEBRIS INDICATORS

TECHNOLOGICAL FIELD

An example embodiment relates generally to a method, apparatus, computer readable storage medium, user interface and computer program product for determining road debris indicators and, more particularly, for determining road debris indicators based upon image data.

BACKGROUND

Modern vehicles include a plurality of different types of sensors for collecting a wide variety of information. These sensors include location sensors, such as global positioning system (GPS) sensors, configured to determine the location of the vehicle. Based upon the location of the vehicle, a variety of navigational, mapping and other services may be provided for manually driven vehicles as well as the provision of navigation and control of autonomous or semi-autonomous vehicles. Other examples of sensors include cameras or other imaging sensors that capture images of the environment including objects in the vicinity of the vehicle. The images that are captured may be utilized to determine the location of the vehicle with more precision. A more precise determination of the vehicle location may be useful in conjunction with the provision of navigational, mapping and other informational services for a manually driven vehicle. Additionally, the more precise determination of the vehicle location may provide for the improved navigation and control of an autonomous or semi-autonomous vehicle by taking into account the location of other objects, such as other vehicles, in proximity to the vehicle carrying the sensors.

The sensors on board vehicles therefore collect a wide variety of data that may be utilized for various purposes. However, these sensors currently on-board vehicles do have limitations and do not provide all of the different types of information that would be useful in various applications. One specific example of a current limitation is in the generation of route guidance and automated vehicle controls in certain scenarios.

BRIEF SUMMARY

A method, apparatus, computer readable storage medium, user interface, and computer program product are provided in accordance with an example embodiment to determine and predict road debris indicators. In this regard, the method, apparatus, computer readable storage medium, and computer program product of an example embodiment may utilize image data collected from vehicles and their surroundings to determine and predict one or more road debris indicators. The reliance upon the collection and analysis of image data may supplement the information provided by other sensors and allow for the provision of different information, such as the type of road debris present which is useful for a variety of applications. As an example, the determination of the location of a road debris indicator may be useful in relation to the provision of more relevant information. Such uses include routing information, alerts, etc. By way of another example, the identification and/or prediction of road debris indicators may also be useful for federal, state, local or other governmental or regulatory officials that design and maintain roads, roadways, sidewalks, public spaces, parks, forests, etc.

One embodiment may be described as a method for providing a road debris indicator detection system comprising obtaining image data of at least one navigable link and determining a road debris indicator based on the obtained image data, wherein the road debris indicator includes road debris classification data and associating the determined road debris indicator with one or more navigable links to update a map layer of a geographic database. This method may be described as further comprising receiving an indication of a location of a vehicle and identifying one or more road debris proximate the location of the vehicle. This method may also further comprise determining a confidence interval associated with the road debris indicator and updating a map layer with the confidence interval.

In some embodiments, the method may further comprise updating the confidence interval associated with the determined road debris indicator based at least in part on the severity of damage done to a vehicle by road debris. The method may also further comprise identifying at least one additional road debris indicator based on navigable links similarly situated to the previously identified navigable links. This method may yet also further comprise providing an alert in response to the determined road debris indicator to at least one end user device.

In some embodiments, the method above may further comprise obtaining image data of the road debris indicator from a vehicle camera system. The method may also further comprise providing route guidance in response to the determined road debris indicator. In yet other embodiments, the method further comprises receiving an indication of a vehicle type and identifying one or more road debris indicators that pose a risk to the indicated vehicle type.

Another embodiment may be described as an apparatus configured to predict road debris indicators, the apparatus comprising at least one processor and at least one memory storing computer program code, the at least one memory and the computer program code configured to, with the processor, cause the apparatus to at least obtain image data of at least one navigable link, determine at least one road debris indicator based on the obtained image data, wherein the road debris indicator includes road debris classification data, and associate the determined road debris indicator with one or more navigable links to update a map layer of a geographic database. The at least one memory and the computer program code may be further configured to, with the processor, cause the apparatus to receive an indication of a location of a vehicle, and wherein the at least one memory and the computer program code are configured to, with the processor, cause the apparatus to identify one or more road debris proximate the location of the vehicle. The apparatus may further comprise determining a confidence interval associated with the determined road debris indicator location and updating a map layer with the confidence interval.

In some embodiments, the apparatus may further comprise updating the confidence interval associated with the determined road debris indicator based at least in part on the severity of damage done to a vehicle by a determined road debris indicator. The apparatus's at least one memory and the computer program code may also be configured to, with the processor, cause the apparatus to obtain the image data via a vehicle camera system. The at least one memory and the computer program code may also be configured to, with the processor, cause the apparatus to generate route guidance.

In yet other embodiments, the at least one memory and the computer program code may be further configured to, with the processor, cause the apparatus to receive an indication of a type of vehicle, and wherein the at least one memory and the computer program code are configured to, with the processor, cause the apparatus to identify one or more road debris proximate the location of the vehicle which pose a risk to the vehicle type.

Yet another embodiment may be described as a user interface for providing a user with a route to a destination, comprising the steps of receiving input upon a user device from the user that indicates a destination, accessing a geographic database to obtain data that represent roads in a region in which the user device is operating, determining a route to the destination by selecting road segments to form a continuous path to the destination, and displaying the determined route or portion thereof to the user, wherein the determined route avoids at least one road segment in response to a road debris indicator. The route determined may avoid one or more road debris indicators proximate to a vehicle based on vehicle type in some embodiments.

All the information, alerts, etc. may be displayed on an end user device (e.g., smartphone, tablet, etc.) and/or in a motor vehicle (e.g., built-in display).

Also, a computer program product may be provided. For example, a computer program product comprising instructions which, when the program is executed by a computer, cause the computer to carry out the steps described herein.

BRIEF DESCRIPTION OF THE DRAWINGS

Figure 1:
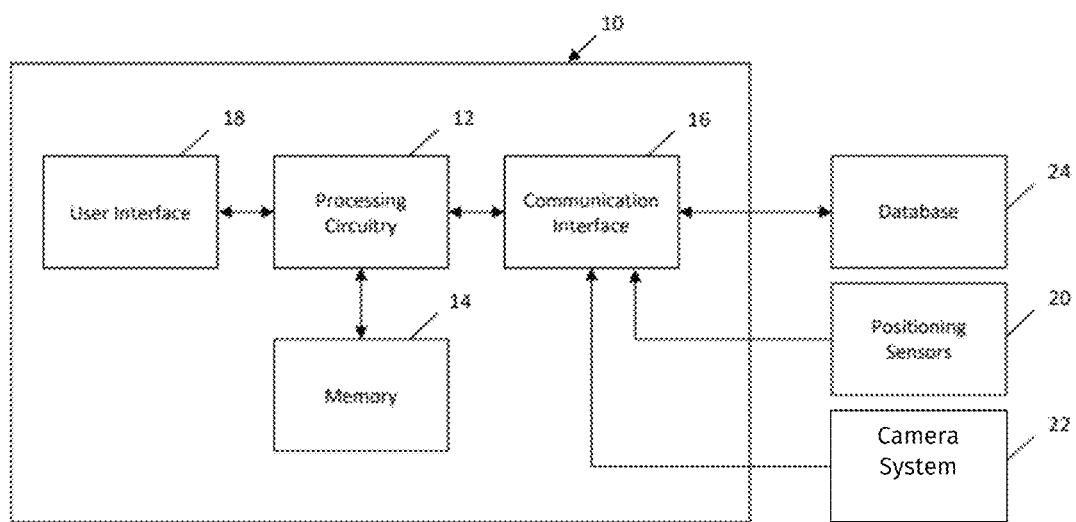
Figure 2:
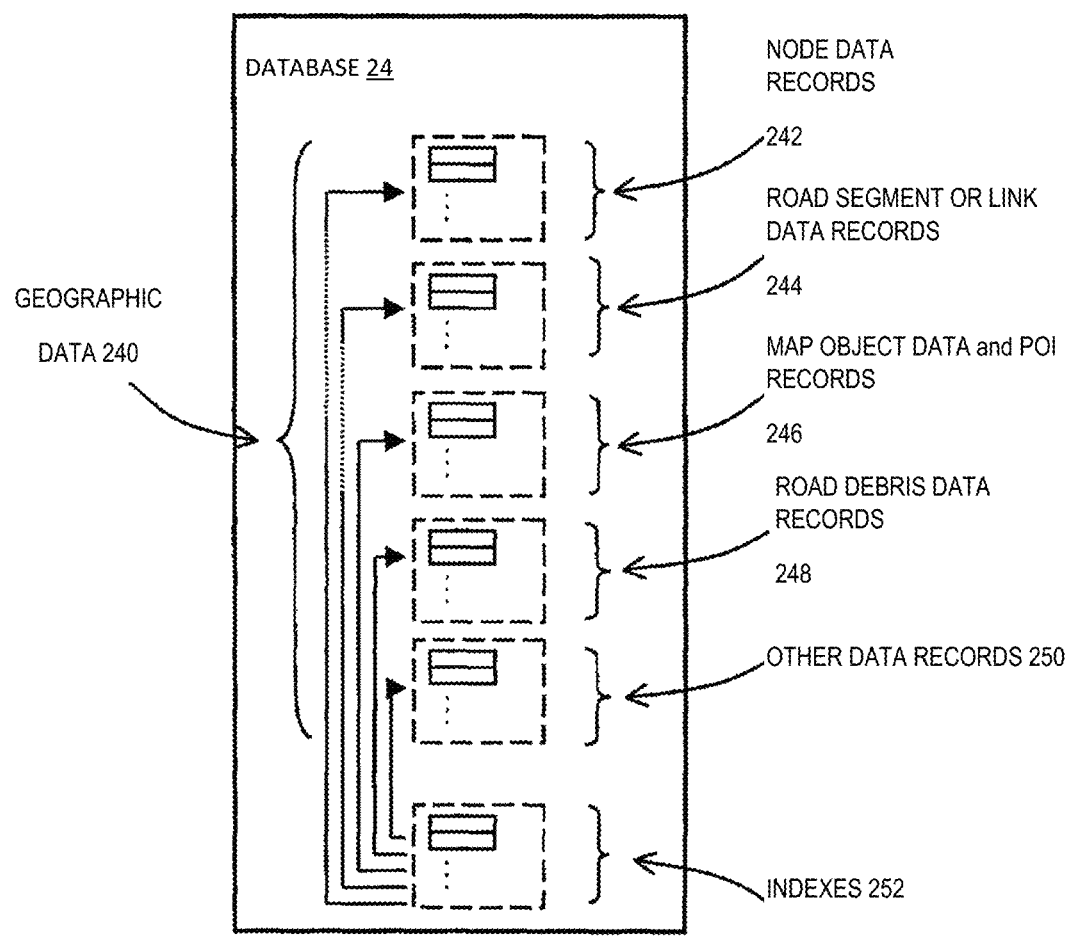
Figure 3A:
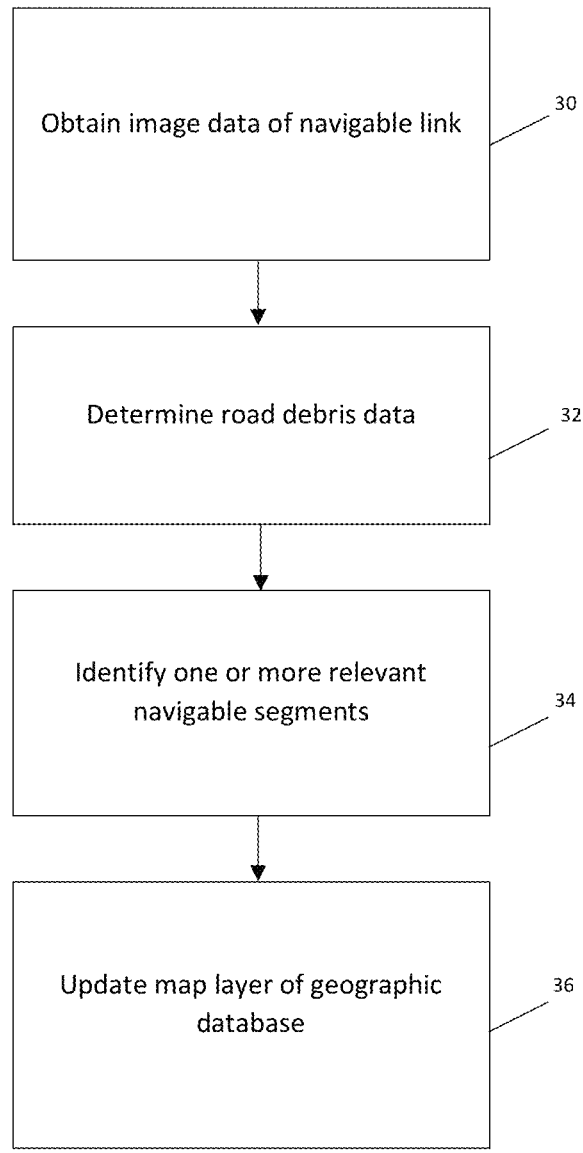
Figure 3B:
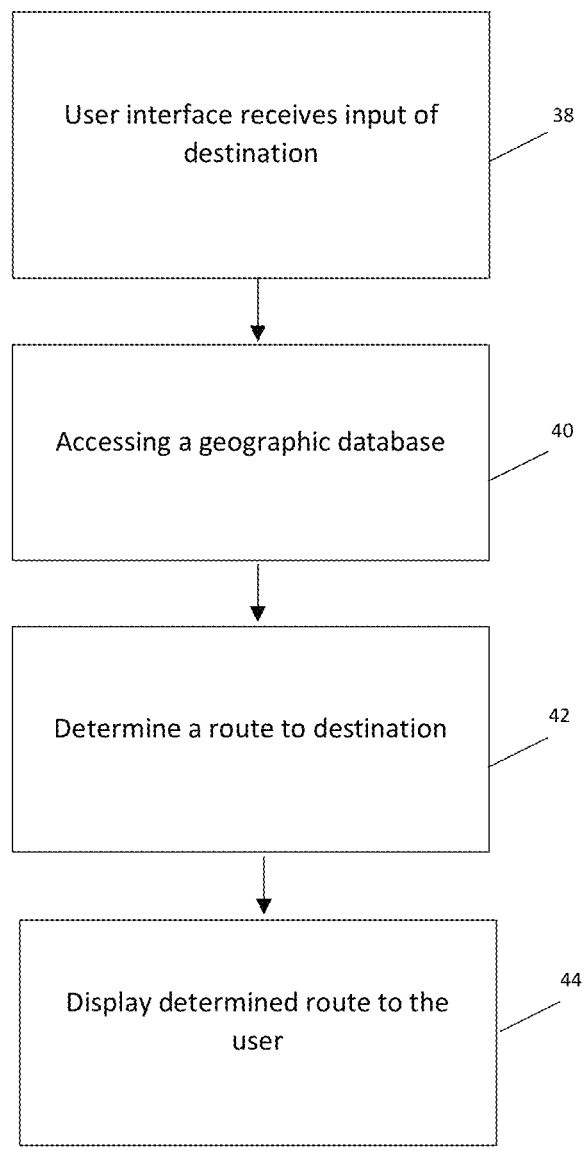
Figure 3C:
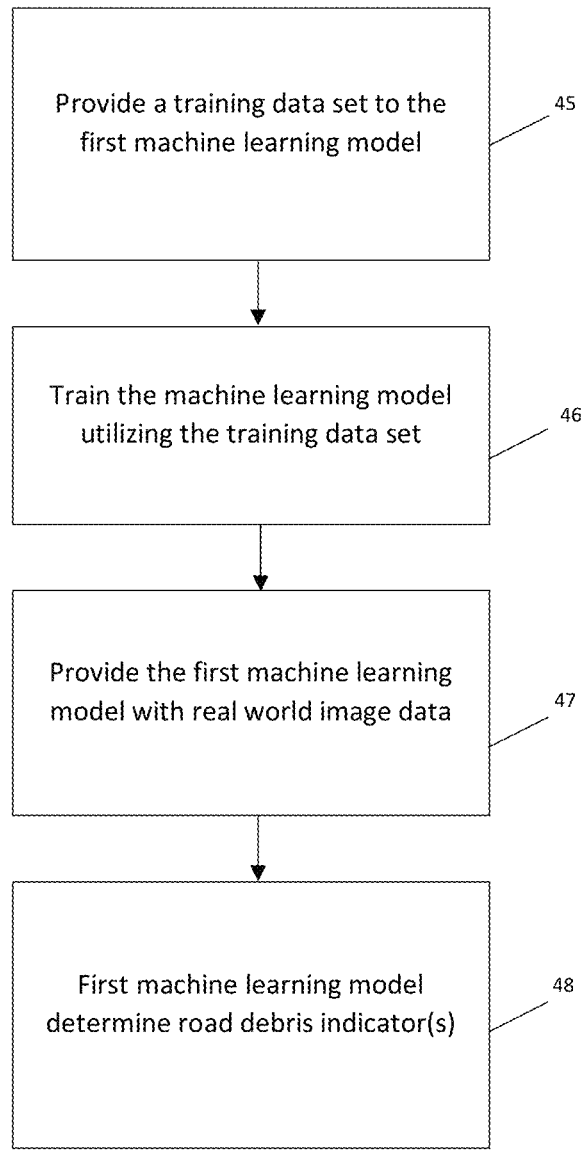
Figure 4:
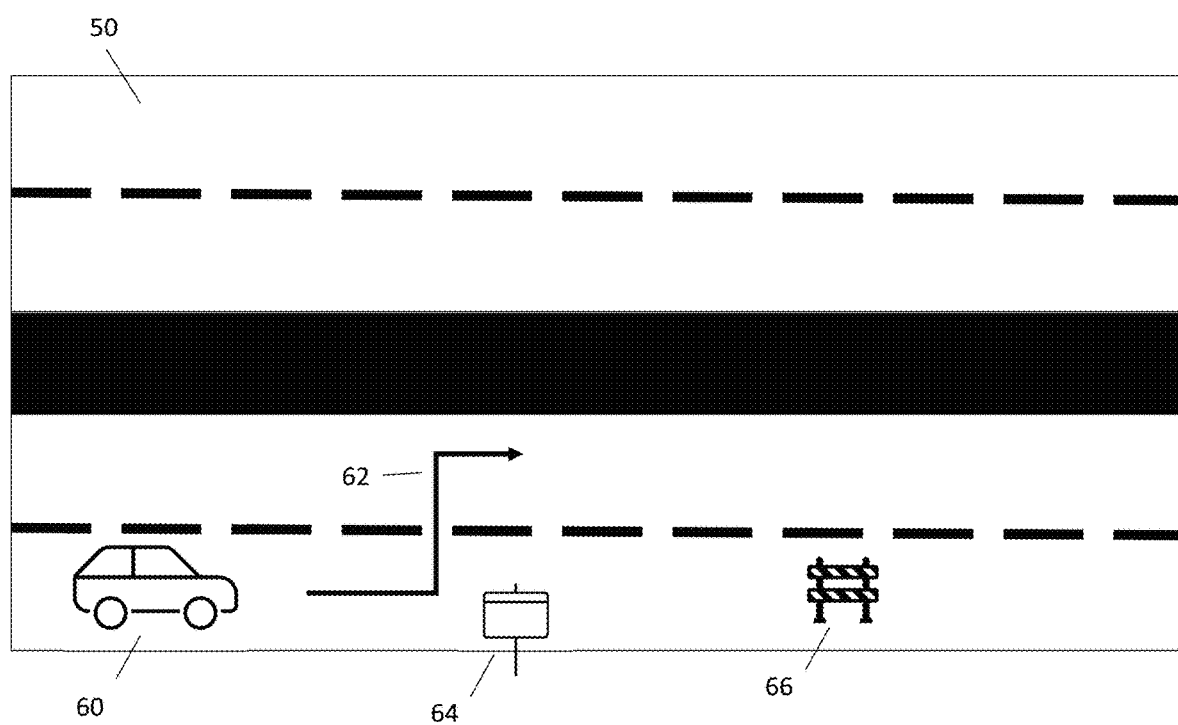
Figure 5:
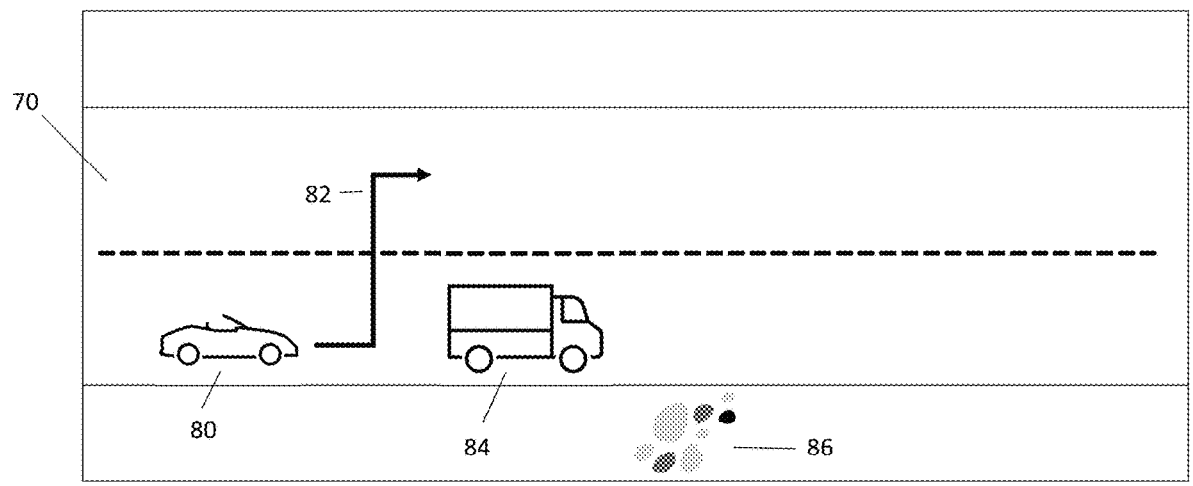
Figure 6:
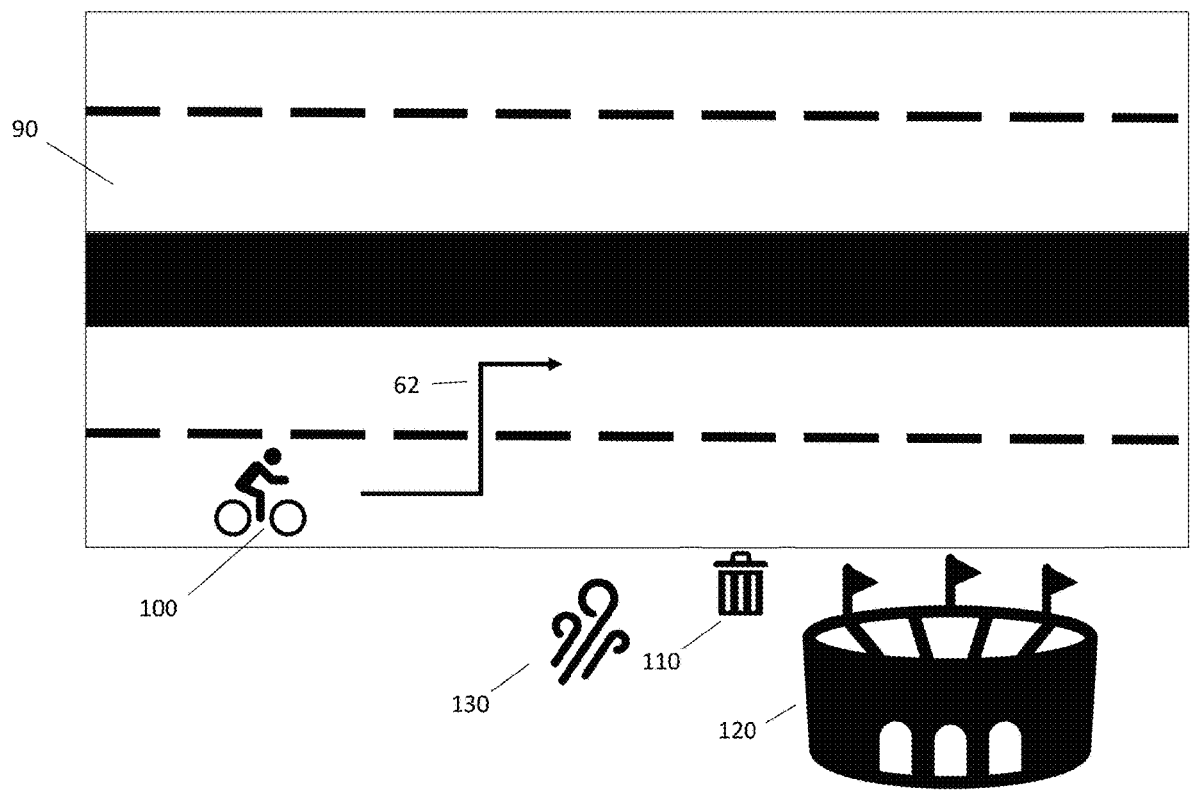

Having thus described certain embodiments of the invention in general terms, reference will now be made to the accompanying drawings, which are not necessarily drawn to scale, and wherein:

FIG. 1 is a block diagram of an apparatus that may be specifically configured in accordance with an example embodiment;

FIG. 2 is a block diagram of a geographic database of an example embodiment of the apparatus;

FIG. 3A is a flowchart illustrating the operations performed, such as by the apparatus of FIG. 1, in order for an apparatus to identify a road debris indicator;

FIG. 3B is a flowchart illustrating the operations performed, such as by the apparatus of FIG. 1, in order to provide a graphical user interface and/or functions thereof;

FIG. 3C is a flowchart illustrating the operations performed, such as by the apparatus of FIG. 1, in order to train machine learning models to predict road debris indicators;

FIG. 4 is a graphical representation of a road upon which a passenger car is present with a road sign proximate to the road;

FIG. 5 is another graphical representation of a road upon which a passenger car is present with road debris proximate to the road;

FIG. 6 is another graphical representation of a road upon which a biker is present.

DETAILED DESCRIPTION

Some embodiments of the present invention will now be described more fully hereinafter with reference to the accompanying drawings, in which some, but not all, embodiments are shown. Indeed, various embodiments may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A system, method, apparatus, user interface, and computer program product are provided in accordance with an example embodiment to determine a road debris indicator based on image data. In order to determine a road debris indicator, the system, method, apparatus, non-transitory computer-readable storage medium, and computer program product of an example embodiment may be configured to obtain image data of at least one navigable link (e.g., roads, sidewalks, trails, walking paths, etc.) including any potential road debris or source of road debris and determine a road debris indicator based on the obtained image data. The image data may be obtained from a vehicle camera system, traffic cameras, etc. The system in this embodiment may then associate the determined road debris indicator with the one or more related navigable links, etc. to update a map layer of a geographic database.

The system, apparatus, method, etc. described above may be any of a wide variety of computing devices and may be embodied by either the same or different computing devices. The system, apparatus, etc. may be embodied by a server, a computer workstation, a distributed network of computing devices, a personal computer or any other type of computing device. The system, apparatus, etc. configured to detect and predict road debris may similarly be embodied by the same or different server, computer workstation, distributed network of computing devices, personal computer, or other type of computing device.

Alternatively, the system, etc. may be embodied by a computing device on board a vehicle, such as a computer system of a vehicle, e.g., a computing device of a vehicle that supports safety-critical systems such as the powertrain (engine, transmission, electric drive motors, etc.), steering (e.g., steering assist or steer-by-wire), and/or braking (e.g., brake assist or brake-by-wire), a navigation system of a vehicle, a control system of a vehicle, an electronic control unit of a vehicle, an autonomous vehicle control system (e.g., an autonomous-driving control system) of a vehicle, a mapping system of a vehicle, an Advanced Driver Assistance System (ADAS) of a vehicle), or any other type of computing device carried by the vehicle. Still further, the apparatus may be embodied by a computing device of a driver or passenger on board the vehicle, such as a mobile terminal, e.g., a personal digital assistant (PDA), mobile telephone, smart phone, personal navigation device, smart watch, tablet computer, or any combination of the aforementioned and other types of portable computer devices.

Regardless of the manner in which the system, apparatus, etc. is embodied, however, an apparatus 10 includes, is associated with, or is in communication with processing circuitry 12, memory 14, a communication interface 16 and optionally a user interface 18 as shown in FIG. 1. In some embodiments, the processing circuitry (and/or co-processors or any other processors assisting or otherwise associated with the processing circuitry) can be in communication with the memory via a bus for passing information among components of the apparatus. The memory can be non-transitory and can include, for example, one or more volatile and/or non-volatile memories. In other words, for example, the memory may be an electronic storage device (for example, a computer readable storage medium) comprising gates configured to store data (for example, bits) that can be retrievable by a machine (for example, a computing device like the processing circuitry). The memory can be configured to store information, data, content, applications, instructions, or the like for enabling the apparatus to carry out various functions in accordance with an example embodiment of the present disclosure. For example, the memory can be configured to buffer input data for processing by the processing circuitry. Additionally, or alternatively, the memory can be configured to store instructions for execution by the processing circuitry.

The processing circuitry 12 can be embodied in a number of different ways. For example, the processing circuitry may be embodied as one or more of various hardware processing means such as a processor, a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry can include one or more processing cores configured to perform independently. A multi-core processor can enable multiprocessing within a single physical package. Additionally, or alternatively, the processing circuitry can include one or more processors configured in tandem via the bus to enable independent execution of instructions, pipelining and/or multithreading.

In an example embodiment, the processing circuitry 12 can be configured to execute instructions stored in the memory 14 or otherwise accessible to the processing circuitry. Alternatively, or additionally, the processing circuitry can be configured to execute hard coded functionality. As such, whether configured by hardware or software methods, or by a combination thereof, the processing circuitry can represent an entity (for example, physically embodied in circuitry) capable of performing operations according to an embodiment of the present disclosure while configured accordingly. Thus, for example, when the processing circuitry is embodied as an ASIC, FPGA or the like, the processing circuitry can be specifically configured hardware for conducting the operations described herein. Alternatively, as another example, when the processing circuitry is embodied as an executor of software instructions, the instructions can specifically configure the processing circuitry to perform the algorithms and/or operations described herein when the instructions are executed. However, in some cases, the processing circuitry can be a processor of a specific device (for example, a computing device) configured to employ an embodiment of the present disclosure by further configuration of the processor by instructions for performing the algorithms and/or operations described herein. The processing circuitry can include, among other things, a clock, an arithmetic logic unit (ALU) and/or one or more logic gates configured to support operation of the processing circuitry.

The apparatus 10 of an example embodiment can also include the communication interface 16 that can be any means such as a device or circuitry embodied in either hardware or a combination of hardware and software that is configured to receive and/or transmit data from/to other electronic devices in communication with the apparatus, such as a database 24 which, in one embodiment, comprises a map database that stores data (e.g., one or more map objects, POI data, etc.) generated and/or employed by the processing circuitry 12. Additionally, or alternatively, the communication interface can be configured to communicate in accordance with various wireless protocols including Global System for Mobile Communications (GSM), such as but not limited to Long Term Evolution (LTE), 3G, 4G, 5G, 6G, etc. In this regard, the communication interface can include, for example, an antenna (or multiple antennas) and supporting hardware and/or software for enabling communications with a wireless communication network. In this regard, the communication interface can include, for example, an antenna (or multiple antennas) and supporting hardware and/or software for enabling communications with a wireless communication network. Additionally, or alternatively, the communication interface can include the circuitry for interacting with the antenna(s) to cause transmission of signals via the antenna(s) or to handle receipt of signals received via the antenna(s). In some environments, the communication interface can alternatively or also support wired communication and/or may alternatively support vehicle to vehicle or vehicle to infrastructure wireless links. GNSS data and corresponding hardware may also be utilized in some embodiments.

In certain embodiments, the apparatus 10 can be equipped or associated with one or more positioning sensors 20, such as one or more GPS sensors, one or more accelerometer sensors, one or more light detection and ranging (LiDAR) sensors, one or more radar sensors, one or more gyroscope sensors, and/or one or more other sensors. Any of the one or more sensors may be used to sense information regarding movement, positioning and location, and/or orientation of the apparatus for use, such as by the processing circuitry 12, in navigation assistance and/or autonomous vehicle control, as described herein according to example embodiments.

In certain embodiments, the apparatus 10 may further be equipped with or in communication with one or more camera systems 22. In some example embodiments, the one or more camera systems 22 can be implemented in a vehicle or other remote apparatuses.

For example, the one or more camera systems 22 can be located upon a vehicle or proximate to it (e.g., traffic cameras, etc.). While embodiments may be implemented with a single camera such as a front facing camera in a consumer vehicle, other embodiments may include the use of multiple individual cameras at the same time. A helpful example is that of a consumer sedan driving down a road. Many modern cars have one or more cameras installed upon them to enable automatic braking and other types of assisted or automated driving. Many cars also have rear facing cameras to assist with automated or manual parking. In one embodiment of the current system, apparatus, method, etc. these cameras are utilized to capture images of vehicles, road signs, streets, etc. as a sedan, etc. travels around. The system, apparatus, etc. takes these captured images (via the camera systems 22) and analyzes them to determine if there are road debris indicators present on a certain street. Various types of roadwork and other sources of road debris may be detected via any functional means.

The data captured concerning the vehicles and windows present may also come from traffic cameras, security cameras, trail cameras, smart phone/tablet cameras, or any other functionally useful source (e.g., historic data, satellite images, websites, etc.).

The analysis of the image data of the vehicle(s) may be carried out by a machine learning model. This model may utilize any functionally useful means of analysis to identify road debris indicators on a given navigable link, roadway, road segment, sidewalk, trail, or in a general area. The system, in this embodiment, may also examine relevant proximate points of interest (POIs), map objects, road geometries, animate objects, road debris, etc. which could suggest the presence of potential road debris indicators.

The locations of vehicles, road sign(s), road debris, any relevant points of interest (POIs), and other types of data which are utilized by various embodiments of the apparatus may each be identified in latitude and longitude based on a location of the vehicle using a sensor, such as a GPS sensor to identify the location of the vehicle. The POIs, map objects, infrastructure, etc. identified by the system may also be detected via the camera systems 22.

In certain embodiments, information detected by the one or more cameras can be transmitted to the apparatus 10, such as the processing circuitry 12, as image data. The data transmitted by the one or more cameras can be transmitted via one or more wired communications and/or one or more wireless communications (e.g., near field communication, or the like). In some environments, the communication interface 16 can support wired communication and/or wireless communication with the one or more camera sensors.

The apparatus 10 may also optionally include a user interface 18 that may, in turn, be in communication with the processing circuitry 12 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processing circuitry may comprise user interface circuitry configured to control at least some functions of one or more user interface elements such as a display and, in some embodiments, a plurality of speakers, a ringer, one or more microphones and/or the like. The processing circuitry and/or user interface circuitry embodied by the processing circuitry may be configured to control one or more functions of one or more user interface elements through computer program instructions (for example, software and/or firmware) stored on a memory accessible to the processing circuitry (for example, memory 14, and/or the like).

Turning to FIG. 2, the map or geographic database 24 may include various types of geographic data 240. This data may include but is not limited to node data 242, road segment or link data 244, map object and point of interest (POI) data 246, road debris data records 248, or the like (e.g., other data records 250 such as traffic data, sidewalk data, etc.). Other data records may include computer code instructions and/or algorithms for executing a machine learning model that is capable of providing a prediction of adverse road locations. The other records may further include verification data indicating: (1) whether a verification of a prediction for an adverse road location was conducted; (2) whether the verification validates the prediction; or (3) a combination thereof.

In one embodiment, the following terminology applies to the representation of geographic features in the database 24. A "Node"—is a point that terminates a link, a "road/line segment"—is a straight line connecting two points, and a "Link" (or "edge") is a contiguous, non-branching string of one or more road segments terminating in a node at each end. In one embodiment, the database 24 follows certain conventions. For example, links do not cross themselves and do not cross each other except at a node. Also, there are no duplicated shape points, nodes, or links. Two links that connect each other have a common node.

The map database 24 may also include cartographic data, routing data, and/or maneuvering data as well as indexes 252. According to some example embodiments, the road segment data records may be links or segments representing roads, streets, or paths, as may be used in calculating a route or recorded route information for determination of one or more personalized routes. The node data may be end points (e.g., intersections) corresponding to the respective links or segments of road segment data. The road link data and the node data may represent a road network, such as used by vehicles, cars, trucks, buses, motorcycles, bikes, scooters, and/or other entities.

Optionally, the map database may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database can include data about the POIs and their respective locations in the POI records. The map database may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database can include event data (e.g., traffic incidents, construction activities, scheduled events, unscheduled events, etc.) associated with the POI data records or other records of the map database.

The map database 24 may be maintained by a content provider e.g., the map data service provider and may be accessed, for example, by the content or service provider processing server. By way of example, the map data service provider can collect geographic data and dynamic data to generate and enhance the map database and dynamic data such as traffic-related data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LiDAR, can be used to generate map geometries directly or through machine learning as described herein. However, the most ubiquitous form of data that may be available is vehicle data provided by vehicles, such as mobile device, as they travel the roads throughout a region.

The map database 24 may be a master map database, such as an HD map database, stored in a format that facilitates updates, maintenance, and development. For example, the master map database or data in the master map database can be in an Oracle spatial format or other spatial format (e.g., accommodating different map layers), such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the map database 24 may be a master geographic database, but in alternate embodiments, a client-side map database may represent a compiled navigation database that may be used in or with end user devices to provide navigation and/or map-related functions. For example, the map database may be used with the mobile device to provide an end user with navigation features. In such a case, the map database can be downloaded or stored on the end user device which can access the map database through a wireless or wired connection, such as via a processing server and/or a network, for example.

The records for road debris indicator data 248 may include various points of data such as, but not limited to: road debris images, road debris location, road debris sources, data concerning type of damage done to a vehicle by certain types of road debris, location and time/date information, height, weight, density, and data on other vehicles or objects present at the time when road debris was detected, etc.

FIG. 3A is a flowchart which demonstrates how the apparatus 10 identifies road debris data indicators. More, fewer, or different acts or steps may be provided. At a first step (block 30) the apparatus may obtain one or more images of at least one navigable link. A navigable link may be, in some embodiments, a sidewalk, roadway, trail, or any other natural or manmade route. The images may be obtained from the camera of an end user device such as a smart phone, the camera system of a vehicle, or even traffic cameras, etc. The apparatus may be trained to analyze the image data (see FIG. 3C) via machine learning model or any other functionally capable means to identify road debris indicators. The images may include but are not limited to actual images or audio data of damage done by road debris and/or the presence of various road debris on a given link. Road debris may be any number of things/types including but not limited to: particulates, dust, dirt, sand, mud, asphalt, concrete, pebbles, rocks/stones/cobbles/boulders, particles of road salt and other deicers, litter, food waste, animal feces/manure, furniture, electrical appliances, and other items of garbage, trash, rubbish and refuse, broken glass, nails, screws, and other often sharp objects, car parts, vehicle wreck debris, damaged tire treads, bicycles parts, roof racks, misplaced luggage, lumber, construction materials, pallets, crates, and other solid objects accidentally or deliberately dropped from moving vehicles, animal corpses (roadkill), broken glass, plastics, and other solid materials from vehicles, ice, sleet, hail, plant branches, sticks, twigs, seeds, nuts, etc.

The presence of the listed road debris above (and many others) may damage vehicles or be a hazard to bikers, walkers, etc. and thus their presence, when detected proximate to a navigable link by the apparatus 10, may be noted as a road debris indicator. Some activities, such as road work projects, trash pickup, large gatherings, etc. may commonly generate road debris and the apparatus 10 may also note the presence of such activities as additional and/or separate road debris indicators. One example could be the presence of road work signs proximate to a roadway. The presence of such a road sign might indicate there is a potential for rocks, pebbles, etc. on the given roadway or proximate to it. The presence of road debris, road signs, etc. can be confirmed by image data captured by passing vehicles capturing ground truth data and images for the given roadway (a navigable link). The image data might also be captured by traffic cameras, etc.

Once these images are obtained, the apparatus may then determine road debris data at another step (block 32). The road debris data may be obtained from the image data above and other sources (e.g., online postings about upcoming construction, vehicle crash alerts, concerts in the park, etc.) and the data may include but is not limited to classification data about the type of road debris present, the type of damage/harm/inconvenience which occurred as a result of said road debris presence, the time such damage, etc. occurred, location the damage, etc. occurred (via GPS), etc.

For example, some public works project only occur at specified times. During these times, road debris might occur or be more plentifully. This road debris might crack a windshield or dent a car by way of gravel kicked up by the presence of the road construction machinery. The apparatus 10 may note the presence of gravel (a type of road debris), the various physical characteristics of the gravel, the damage done—a cracked windshield (versus a chip, full break, small scratch, no damage, etc.) and the road segment upon which the road debris was located and where the damage occurred. In this example, there are various types of window damage which might be accounted for by the apparatus 10 as the result of road debris including but not limited to: chips, pits, bulls-eye pattern cracks, star pattern cracks, linear cracks, curved cracks, circular cracks, fully shattered/spider webbed, and combinations therein. Other damage to car might include chips or scrapes to the paint, dents to the car's body, etc. It should be noted all of the information mentioned above may serve as both road debris data and/or road debris indicators.

In this example, once a damaged car has been identified, the apparatus may then identify one or more navigable (e.g., road) segments (block 34) upon which the damage occurred. The identification of the relevant road segments may be done via a vehicle's onboard GPS (see FIG. 1) or any other functional means. Once identified, the apparatus may then update a map layer of a geographic database (block 36). The updating of the map layer may include but is not limited to identifying/associating locations of the identified relationships with certain navigable segments and then providing a data indicator or flag to mark that a given road segment or attribute (metadata) may be used as an identifier when needed to access or retrieve the road segments for various navigation functions. This data can also be used to generate alerts and analyze other similarly situated road segments for the potential risk, route changes, etc. a given road debris indicator might pose. The road segment data may also include sidewalk data or areas included in/associated with the navigable link records such as the road segment records. The road segment records may also represent path records such as sidewalks, hiking trails, or any other natural or manmade navigable link.

It should be noted the apparatus 10 is capable of detecting, predicting, and differentiating road debris types and amounts based on image analysis, online data sources, historical data and databases, etc. For example, small rocks and small pieces of rubber may look similar when photographed but can have different consequences when run over by an end user. The apparatus 10 might observe a pile of refuse along a roadway and be unable to determine if it is rocks, rubber, metal, or some other type of refuse based on image data alone. Thus, the apparatus 10 could take this image with the preliminary road debris identification and then further observe the road debris over time to determine if it is lightweight rubber or heavier rocks, metal, etc. (which is more dangerous). Such observation might include how easily the refuse is blown by the wind. Additionally, if the refuse's impact on a car, biker, or pedestrian (e.g., damage done, if any) when they come into contact with the unidentified refuse may also be observed to further aid the apparatus in identification of the type of road debris.

Turning to FIG. 3B, the apparatus 10 may support a user interface 18 (as shown in FIG. 1). More, fewer, or different acts or steps may be provided. At a first step, the user interface may receive an input of destination from an end user (block 38). This input of destination may be received via an end user device graphical user interface (GUI) running upon a smartphone, tablet, integrated vehicle navigation system, etc. Once a destination is input, the apparatus may then access a geographic database (block 40) and determine a route to the input destination (block 42). The determined route may, in some embodiments, avoid at least one road segment in response to a determined road debris indicator. As mentioned above, the determination of indicator may be based on any functionally capable means including identification of road debris, actual damage done to vehicles, road work signs, and/or various other data sources.

Notwithstanding how the apparatus generates a determination of a road debris indicator, this information may then be used to route the end user towards or away from certain navigable links such as a road segment when generating a route. The route determined by the apparatus 10 may then be displayed to then end user (block 44) via the same or a different user interface. The apparatus can take any number of additional actions (or in place of) what is called for in block 44. For example, the apparatus may provide audio guidance instead of a visual display. The navigation instructions may also be provided to an autonomous vehicle for routing (for example, without any display to the user). It should also be noted the UI can be run by a processor and stored upon one or more types of memory in some embodiments.

Referring now to FIG. 3C, the operations performed, such as by the apparatus 10 of FIG. 1, in order to train a machine learning model to detect/predict road debris indicators. More, fewer, or different acts or steps may be provided. As shown in block 45, the apparatus includes means, such as the processing circuitry 12, memory 14, the communication interface 16 or the like, for providing a training data set that includes a plurality of training examples. In this regard, the training data set may be provided by access to the processing circuitry of the training data set stored by the memory. Alternatively, the training data set may be provided by access to the processing circuitry to a database 24 or other memory device that either may be a component of the apparatus or may be separate from, but accessible to the apparatus, such as the processing circuitry, via the communication interface. It should be noted the system apparatus may utilize more than one machine learning model to carry out the steps described herein.

In accordance with an example embodiment, the apparatus 10 also includes means, such as the processing circuitry 12, the memory 14 or the like, configured to train a machine learning model utilizing the training data set (block 46). The machine learning model, as trained, is configured to detect and predict road debris indicators. The prediction may be based, at least in part, upon image data of road debris, road debris sources, and the impact road debris has on animate objects and/or the environment.

The apparatus 10, such as the processing circuitry 12, may train any of a variety of machine learning models to identify road debris indicators based upon a single or plurality of images. Examples of machine learning models that may be trained include a decision tree model, a random forest model, a neural network, a model that employs logistic regression or the like. In some example embodiments, the apparatus, such as the processing circuitry, is configured to separately train a plurality of different types of machine learning models utilizing the same training data including the same plurality of training examples. After having been trained, the apparatus, such as the processing circuitry, is configured to determine which of the plurality of machine learning models predicts road debris indicators based upon image data with the greatest accuracy. The machine learning model that has been identified as most accurate is thereafter utilized.

In one example, the machine learning model may be a deep learning neural network computer vision model that utilizes image data of road debris, relevant context for the road debris in each environment, etc. to automatically identify road debris indicators. A training example for this first machine learning model may also include image data of known types of road debris and damage done by said road debris. For example, known types of window damage might include but is not limited to chips, pits, bulls-eye pattern cracks, star pattern cracks, linear cracks, curved cracks, circular cracks, fully shattered/spider webbed, and combinations therein. Various images of different types of damaged windows and/or the road debris which caused the damage may be provided to the machine learning model to train and improve its accuracy and enable to correlate certain types of road debris to certain types of damage (or lack thereof).

In some example embodiments, a balance or trade-off between the accuracy with which the road debris indicators are identified and the efficiency with which the machine learning model identifies them is considered. For example, a first set of images may produce the most accurate identification, but a second combination of images may produce an identification of relevant objects (e.g., damage done, actual road debris, etc.) that is only slightly less accurate, but that is significantly more efficient in terms of its prediction. Thus, the second combination of images that provides for sufficient, even though not the greatest, accuracy, but does so in a very efficient manner may be identified by the apparatus 10, such as the processing circuitry 12, as the preferred images to be provided to the machine learning model to identify road debris indicators in subsequent instances.

In some embodiments, a training example also includes information regarding a map object, such as a map object that is located at the location at which the image data was captured. One example of a map object is a bridge, and another example of a map object is a railroad crossing. A wide variety of other map objects may exist including, for example, manhole covers, transitions between different types of road surfaces, medians, parking meters, trash cans, dumpsters, various forms of infrastructure, or the like. As described in more detail below, the map object that is included in a training example may be determined or provided in various manners. For example, the map object may be defined, either manually or automatically, by reference to a map database 24 and identification of a map object at the same location or at a location proximate, such as within a predefined distance of, the location at which the corresponding image data was captured. The training example may also include point of interest (POI) data. A POI may be something like a stadium, concert venue, restaurant, park, school, bus stop, etc. Relevant POIs may also be defined, either manually or automatically, by reference to a map database 24 and identification of a POI at the same location or at a location proximate, such as within a predefined distance of, the location at which the corresponding image data was captured. The location of relevant POIs and/or map objects may be found by GPS coordinates or any other functionally capable means.

Yet other various types of data may also be utilized when training the machine learning model including map geometry data, historic data, weather data, wind patterns, etc. Ground truth data may also be utilized with a combination of these different features for supervised machine learning.

Once trained, the machine learning model may then be provided various real-world data as mentioned in block 47 and used to determine road debris indicators based on the various data points above and others (block 48).

An example of the apparatus 10 detecting and/or predicting a road debris indicator is that of a sedan or other car driving along a 2-lane highway. As the car drives down the road, it comes upon a sign which says, "Road Construction Ahead 2 Miles". The apparatus 10 will capture images of the road sign via the car's camera system 22. The image data captured is provided to the machine learning model which, when trained, may identify the road sign as well as any road debris objects in proximity to the roadway (e.g., rocks, construction refuse, etc.).

One such road debris object, in this example, could be gravel on the roadway, the shoulder, or otherwise proximate to the roadway, generated from road construction (or present for any other reason such as a spill). The type of road debris (e.g., gravel from road construction) determination and the relevant other information identified may be provided to the machine learning model. The machine learning model will then be able to predict if and where road debris is (or might) occur on a given roadway. In this example, since the car has passed a road sign indicating roadwork is occurring and there is actual confirmed road debris present in the form of gravel, the apparatus 10 may predict if there is a high likelihood damage might occur to a given vehicle.

The machine learning model in this example makes its determination based on a combination of specific factors (map data, image data, etc.), and the model predicts the potential for vehicle damage because of specific factors in a specific combination or configuration are present. The factors in this example may include the image data of the road sign and road debris (together in one image or as separate images), image data of the roadways, image data of other objects proximate to the roadway (e.g., dumpsters, debris, construction materials, construction vehicles, etc.) as well as time of day data, historic data, etc. This set of data, provided to the learning model, matches (or is like) the factors used in the training process (in this example). This allows the machine learning model to predict if road debris (which is likely to damage a given vehicle) may occur at a location given the time of day, vehicles, and type of road debris present, etc. The presence of road debris and/or the road debris potential damage/effect on a given vehicle may be predicted by the same or separate machine learning models in some embodiments.

The determination of the presence of the potential for damage (based on the road debris indicator(s)) can then be utilized in various ways. The apparatus 10 may alert the driver of a given vehicle (and other end users) via graphical user interface that there could be (or is) a risk ahead. The apparatus 10 may also update one or more map layers and/or databases to account for this determination. In some embodiments, the identified location of potential road debris may be used to activate autonomous or highly assisted driving features. For example, if the sedan discussed above had self-driving capabilities the apparatus 10 could activate the self-driving mode in response to the road debris indicators to avoid potential damage caused by them (and improve safety by avoiding veering by the end user in response to road debris striking their vehicle, bike, etc.).

The determined road debris indicator(s) may be utilized in other ways. For example, the apparatus 10 may provide to the end user updated route guidance which avoids certain areas with the potential for damage from road construction debris in real time. Continuing with the example above, the apparatus 10 may look at existing map data to determine a better route which avoids the construction all together with no real time re-routing needed.

As mentioned before, the apparatus 10 features one or more machine learning models. This model and other data may be used by the apparatus 10 to not only analyze real time driving situations as mentioned above but also examine existing map data to identify other similarly situated navigable links such as roadways. These similar roadways will have similar POIs, map objects, etc. So, for example, if there was another roadway with gravel proximate to it (but no road construction sign), the apparatus 10 may be able to detect such a similar roadway and provide alerts, route guidance, etc. to an end user to avoid the potential damage risk.

Turning to FIG. 4, some of the examples discussed above are illustrated. Specifically, a sedan 60 is shown driving down a roadway 50. On the roadway 50 there is a road sign 64 and a road works project 66 ahead (proximate to the roadway). As shown in FIG. 4, the sedan 60 is utilizing the apparatus 10 to predict the potential for road debris. The apparatus 10 identifies the road sign 64 via images from the camera system 22, traffic cameras, etc. and feeds those images into the machine learning model which determines the type of road sign present (e.g., a road construction sign, electronic sign, speed limit sign, etc.). The apparatus then takes this data along with relevant other information such as the image data of the actual road works/construction project 66 and feeds it back to the machine learning model (or to another model, algorithm, etc.) to determine if there is likely potential for road debris on the given roadway.

It should be noted that the sedan 60 in this example represents any vehicle. Such vehicles may be standard gasoline powered vehicles, hybrid vehicles, an electric vehicle, a fuel cell vehicle, and/or any other mobility implement type of vehicle (e.g., bikes, scooters, etc.). The vehicle includes parts related to mobility, such as a powertrain with an engine, a transmission, a suspension, a driveshaft, and/or wheels, etc. The vehicle may be a non-autonomous vehicle or an autonomous vehicle. The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order, and may respond to lane marking indicators (lane marking type, lane marking intensity, lane marking color, lane marking offset, lane marking width, or other characteristics) and driving commands or navigation commands. In one embodiment, the vehicle may be assigned with an autonomous level. An autonomous level of a vehicle can be a Level 0 autonomous level that corresponds to a negligible automation for the vehicle, a Level 1 autonomous level that corresponds to a certain degree of driver assistance for the vehicle, a Level 2 autonomous level that corresponds to partial automation for the vehicle, a Level 3 autonomous level that corresponds to conditional automation for the vehicle, a Level 4 autonomous level that corresponds to high automation for the vehicle, a Level 5 autonomous level that corresponds to full automation for the vehicle, and/or another sub-level associated with a degree of autonomous driving for the vehicle.

It should be noted that in some embodiments, the apparatus 10 may track and differentiate the types of vehicles on a given navigable link based on make/model, size, fuel type, transmission type, number of wheels, vehicle features (e.g., lift kits, alloy wheels, droptop, etc.), age, value, etc. This data may be used for various functions including providing customized alerts and route guidance regarding road debris based on vehicle data and other factors.

In one embodiment, a graphical user interface (GUI) may be integrated in the vehicle, which may include assisted driving vehicles such as autonomous vehicles, highly assisted driving (HAD), and advanced driving assistance systems (ADAS). Any of these assisted driving systems may be incorporated into the GUI. Alternatively, an assisted driving device may be included in the vehicle. The assisted driving device may include memory, a processor, and systems to communicate with the GUI. In one embodiment, the vehicle may be an HAD vehicle or an ADAS vehicle. An HAD vehicle may refer to a vehicle that does not completely replace the human operator. Instead, in a highly assisted driving mode, a vehicle may perform some driving functions and the human operator may perform some driving functions. Such vehicle may also be driven in a manual mode in which the human operator exercises a degree of control over the movement of the vehicle. The vehicle may also include a completely driverless mode. The HAD vehicle may control the vehicle through steering or braking in response to the on the position of the vehicle and may respond to lane marking indicators (lane marking type, lane marking intensity, lane marking color, lane marking offset, lane marking width, or other characteristics) and driving commands or navigation commands. Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the position of the vehicle or based on the lane marking indicators (lane marking type, lane marking intensity, lane marking color, lane marking offset, lane marking width, or other characteristics) and driving commands or navigation commands.

In this example, there is a road construction project 66 obstructing the roadway but the road construction equipment, road debris, refuse, etc. may also be adjacent to the roadway 50 (or another navigable link) in some embodiments. If such debris, etc. is present proximate to the roadway the apparatus 10 may detect it via traffic cameras, vehicle cameras, etc. The apparatus 10 uses all this information (e.g., data from the road sign, road construction refuse present, etc.) via the one or more machine learning models to determine if there are any road debris indicators present. In this example, it is determined by the apparatus 10 that there is a high likelihood of road debris ahead of the sedan 60. This conclusion may be based on not only the presence of the road sign 64 but also the road work project 66 in the actual roadway 50, both of which are considered road debris indicators in this example. In some embodiments, the apparatus 10 may extract information from the road sign 64 by use of OCR and/or NLP to improve accuracy.

In one embodiment, the apparatus 10 may use optical character recognition ("OCR") in conjunction with one or more databases (see FIG. 2) to determine text of a geographic object. Additionally, the apparatus 10 may compare features or components (such as invariant components relating to a road sign) in or from images to reference features or components in one or more reference databases (or data libraries) to detect a symbol or feature (such as a road works sign diamond symbol). The apparatus 10 may then record (in a database) the determined text, the identified symbols and/or graphics thereof, and/or other features or determinations. For example, the road sign 64 in this case might feature text which says "ROAD WORK AHEAD 500 FEET" along with being a traditional orange roadworks sign. The apparatus 10 can extract this text along with the shape and color of the sign to determine its meaning and content, at least in part, by comparing the current sign to a database of reference information.

As mentioned above, OCR may be used to extract the information from a road sign 64 and natural language processing (NLP) technologies may be used in conjunction with the OCR tools to aid the apparatus 10 in analyzing various signs. NLP may be used in some embodiments to address issues around word segmentation, word removal, and summarization to determine the relevancy of the various parsed data. In various embodiments, semantics of the various parsed data are determined based on a vocabulary model in a grammar module. For example, in various embodiments, probabilistic latent semantic indexing (pLSI) or Latent Dirichlet allocation (LDA) may be used to deduce semantics from words in the extracted road sign text and determine their relevancy. Such methods can be used to derive text and topics from a set of road work terms.

Based off this information, the apparatus may provide to the driver of the sedan 60 an alert (e.g., a high-risk alert) along with route guidance 62 to avoid the area with road debris indicator(s) stemming from the road construction project 66. The route guidance 62 provided by the apparatus 10 is shown as an arrow which represents a suggested way to avoid the project (e.g., drive around it in the other lane to avoid gravel and other refuse that could damage the vehicle). This data could also then be used by the apparatus to provide an alert or route guidance to other user(s) in the area. The suggested route change mitigates the risk of damage while in some other examples, automatic braking, etc. may be applied by the apparatus 10 to avoid higher risk situations.

Route guidance may include various guidance options, visual and/or audio. For example, visual guidance on how and when to change lanes or audio guidance relaying the same information. Automatic driver controls like those for an autonomous vehicle (e.g., an automatic lane change that can include an explanation to the passenger on what is happening), etc. The guidance itself can include the alert messages as mentioned above so the generation of alerts and route guidance can be the same function. When calculating the route and route guidance, metadata such as a data flag or attribute of road segments are taken into consideration when forming different suggested routes and one or more segments are excluded from these routes when it is determined (by the apparatus) that one or more road debris is associated with the omitted segment(s).

In some embodiments, apparatus 10 may generate a confidence interval/score which reflects the likelihood a given roadway or navigable link contains road debris indicator(s). In the example above, the apparatus 10 can read the road sign 64 and extract relevant information such as the general area of road work (e.g., that there is road work ahead in 500 ft, 0.25 miles, etc.). From the presence of this sign, the confidence score for the likelihood of a road debris indicator on the given roadway may be increased from 0 to 0.25. The apparatus 10 may then receive additional information from other sources (e.g., other cars, traffic cameras, traffic alerts, etc.) which can increase or decrease this confidence score. For example, if there is image data of the actual road, which is clear of debris, the apparatus 10 might lower the confidence score for the likelihood of road debris indicators on the roadway from 0.25 to 0.1. Alternatively, if the road construction presence is confirmed by the presence of an actual road works project 66 on a given roadway (e.g., lanes blocked, equipment present, road debris, refuse, etc.) the confidence interval may be boosted up to 0.75 as the equipment's presence may increase the risk of road debris (and damage). This confidence interval can be updated in real time and is useful for numerous tasks including keeping an accurate record of potential sources of road debris indicators (e.g., the road construction project) as they move around/along a roadway.

As mentioned above, in some embodiments, the apparatus 10 may provide alerts, route guidance, etc. to various end users of the apparatus 10. In some embodiments, the end users may be pedestrians, bikers, motorcyclists, and/or driving various types of commercial or industrial vehicles. In some embodiments, the apparatus 10 may adjust the alerts, route guidance, etc. provided to a given end user depending on their mode of travel. For instance, someone on a bike and someone in a car may be impacted by certain forms of road debris in very different ways. An end user in a car may be able to pass through a cloud of dust or drive over small road debris, rocks, etc. easily. Another end user traveling through the same area as the car on a bike may instead be severely hampered by dust, rocks, etc. which could cause someone on a bike to crash. Thus, the present apparatus 10 may record data about road debris including its impact or potential impact on different end users utilizing different travel modalities. Such data may be stored in one or more databases as described in FIG. 2.

In this embodiment and others, the apparatus 10 may also detect or prompt an end user to record their current or preferred travel modality (e.g., walking, running, biking, driving, etc.) by any functional means including capturing image data of a given end user within their automobile or on their bike, walking down a trail, etc. Image recognition/analysis may be used in a manner similar to what is used to identify various road debris to also identify how a given end user is traversing a given navigable link. With this information about an end user's current (or future) mode of transport and how road debris might impact that mode of transport, the apparatus 10 may, in some embodiments, generate customized route guidance and alerts which account for this data.

FIG. 5 illustrates another example embodiment. Specifically, a convertible 80 is shown driving down a different roadway 70. Next to the roadway 70 there is a large truck (e.g., semitruck) 84 ahead of the convertible 80. As shown in FIG. 5, the convertible 80 is utilizing the apparatus 10 to predict if are road debris indicators in the area. The apparatus 10 identifies the large truck 84 as well as road debris 86 (e.g., loose gravel) via images from the camera system 22, traffic cameras, etc. and feeds those images into a machine learning model which determines the presence of road debris indicators. The apparatus 10 then takes this data along with relevant other information and generates alerts, routing information, etc.

In this example, the apparatus 10 may examine the presence of the loose gravel road debris 86 along with the presence of the large truck 84. The large truck takes up more space on the given roadway 70 and its size relative to the convertible means there is a higher likelihood for the truck to kick the loose gravel into the convertible with its top down creating a safety concern. The size of the truck also means it may be more likely to come into contact with the loose gravel as the truck passes by said gravel. The apparatus 10 may examine all these factors and others to determine the risk to the convertible and alert the drivers of both vehicles based on the determined road debris indicators.

In this example, the apparatus 10 has confirmed the presence of the road debris 86 by image data and its presence may serve as an affirmative road debris indicator. However, if the truck 84 was not present the mere presence of a given road debris 86 might not warrant alerting a certain end user based on the type and amount of road debris present when factoring in their mode of transport. For example, if an end user was walking down the roadway 70 alone, the gravel road debris 86 might pose little risk to them. However, if a car is present and might kick the gravel into the walking end user, the risk is higher and the apparatus 10 may send alerts, etc. in response.

As mentioned in the discussion for FIG. 4, a confidence interval may also be generated based on the likelihood that road debris indicator(s) are present on a given roadway. With the instant example, the apparatus 10 may attribute a confidence score of 0.25 based on the presence of the truck 84 alone on the roadway 70. This score can be based on historical data concerning which vehicles most commonly cause damage by kicking up road debris, what type of road debris is commonly affected by a given type of vehicle, etc. The fact that there is loose gravel 86 present on the roadway 70 (confirmed by image data) may be accounted for by the apparatus 10 and used to boost the confidence interval from 0.25 to 0.75 as there is a good chance the truck 84 might kick up the gravel into other cars.

The apparatus 10 may further confirm the presence and location of road debris indicators by monitoring for image data of actual damage such as broken vehicle windows. Continuing with this example, if the convertible ignored the route advice 82 and drove behind the truck 84 past the gravel 86 and the tuck did kick/propel a piece of loose gravel into the convertible's windshield the apparatus 10 may identify this via any damage done to the window. If the loose gravel chipped, cracked, or otherwise damaged the convertible's window(s) as the two vehicles pass the loose gravel 86 the apparatus 10 may observe such damage via image data, audio data, etc. The severity of the damage along with other factors may be used to boost or reduce the confidence score mentioned above. In this case, since the gravel damaged the convertible's windshield, the confidence score would be raised as the presence of road debris indicator(s) has been confirmed by actual damage. The apparatus 10 may generate alerts, provide route guidance, update map layers, and/or implement automatous driving controls in response.

The apparatus 10, in some embodiments, may also monitor for common sources of road debris. In the example above, if the truck 84 was a dump truck hauling gravel or road salt, the open back of the dump truck may result in some of the salt, rocks, gravel, etc. being dropped or otherwise exiting the dump truck as the truck drives down a given roadway. The presence of potholes, uneven roadway, large bumps, etc. might exacerbate the amount of salt, rocks, etc. dropped by the dump truck and thus result in a higher likelihood of road debris and potential damage to surrounding people and vehicles. Modifying the example above slightly, if the convertible was traveling behind dump truck the apparatus 10 may generate a high confidence score for road debris potential based on the contents of the dump truck's bed (e.g., gravel, salt, etc.). Thus, the apparatus 10 in some examples need not observe actual road debris present on a roadway to generate an alert, route guidance, etc. regarding the risk of road debris being present.

In this example, the convertible 80 may be disproportionately impacted by certain types of road debris (e.g., dust, sand, small rocks) which a sedan or other vehicle might be able to resist more easily. Thus, in some embodiments, the apparatus 10 may generate alerts for specific makes/models of vehicles depending on the observed and predicted impact of a given type and amount of road debris upon a specific mode of transport, vehicle type, etc.

FIG. 6 illustrates yet another example embodiment. Specifically, a biker 100 is shown traveling down a roadway 90 towards a popular stadium 120. Outside this stadium 120 there is a trashcan 110. Also shown is a strong wind 130 which is blowing across the roadway 90. It is also important to note that, in this example, the wind 130 is blowing in a direction from the stadium 120 (and trashcan 110) towards the road 90. In this example, it is game night at the stadium 120 and there is a sold-out crowd (confirmed by online data, image data, etc.). In response to this large gathering at the stadium 120 the trashcan 110 might be full or even overflowing (confirmed by image data in this example). Additionally, the strong wind 130 blowing towards the road 90 might results in road debris (trash from the trashcan 110) being blown into the roadway. The weather data may be observed in real time by various end user probes (e.g., cameras, thermometers, barometers, windsocks, weather gages, etc.). or gathered from a national or local weather service or another source. Thus, in this embodiment, the presence of the full stadium, wind, and trashcan proximate to the roadway may be used by the apparatus 10 as one or more road debris indicator(s). The presence of actual road debris from the trashcan 110 overflowing or getting knocked over by the wind 130 may further boost the apparatus 10 assessment that there is a risk for road debris on the roadway 90.

In some embodiments, various scheduling information may be provided to the apparatus 10 via the internet websites or another data source. This scheduling information might include data which is relevant to the presence of road debris in a given location. For example, garbage collection/pickup days may result in there being refuse on a given navigable link only on certain days. Such trends may be observed via image data or any other functional means. The apparatus 10 might use this information to create or adjust alerts, route guidance, etc.

Additionally, in the example shown, the apparatus 10 may also analyze the type of road debris present as well as the amount of said debris to determine the risk it might pose to a given end user. In this example, the bike 100 may be hampered or stopped by the presence of empty drink containers, food wrappers, etc. while an end user in a car may be able to simply drive by. The apparatus 10 in this example may identify the end user 100 on their bike via image data, etc. and generate alerts and/or route guidance 62 to steer around the area where trash might be blown by the wind 130. The apparatus 10 may provide this alert to end users who are walking, roller blading, etc. (as confirmed by the end user manually or via image data, etc.) as they may be similarly hampered by such trash (road debris) while something like a city bus can travel through the same roadway 90 unaffected by the trash.

In some embodiments, the apparatus 10 may also be used to track and predict refuse and other road debris as it naturally or unnaturally (e.g., littering) propagates throughout an area, roadway, etc. Such tracking may be carried out by capturing image data of the road debris and combining this information with weather propagation data such as propagation maps stored in one or more databases. Based on these detected and predicted propagation paths, locations, etc. end users may be able to track specific types of refuse and where they commonly accumulate by way of the apparatus 10. For example, if paper products typically blow away from the stadium illustrated in FIG. 6 and become trapped in a chain-link fence across the street, recycling efforts could be aided by tracking such paper refuse and sending an alert to an end user to collect it.

It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 14 of an apparatus 10 employing an embodiment of the present invention and executed by the processing circuitry 12. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Furthermore, in some embodiments, additional optional operations may be included. Modifications, additions, or amplifications to the operations above may be performed in any order and in any combination.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for providing a road debris indicator detection system comprising:
    obtaining image data of at least one navigable link;
    determining a road debris indicator based on the obtained image data, wherein the road debris indicator includes road debris classification data; and
    associating the determined road debris indicator with one or more navigable links to update a map layer of a geographic database.

2. The method according to claim 1, further comprising receiving an indication of a location of a vehicle and identifying one or more road debris proximate the location of the vehicle.

3. The method according to claim 2, further comprising determining a confidence interval associated with the road debris indicator and updating a map layer with the confidence interval.

4. The method according to claim 2, further comprising updating the confidence interval associated with the determined road debris indicator based at least in part on the severity of damage done to a vehicle by road debris.

5. The method according to claim 2, further comprising identifying at least one additional road debris indicator based on navigable links similarly situated to the previously identified navigable links.

6. The method according to claim 1, further comprising providing an alert in response to the determined road debris indicator to at least one end user device.

7. The method according to claim 1, further comprising obtaining image data of the road debris indicator from a vehicle camera system.

8. The method according to claim 1, further comprising providing route guidance in response to the determined road debris indicator.

9. The method according to claim 1, further comprising receiving an indication of a vehicle type and identifying one or more road debris indicators that pose a risk to the indicated vehicle type.

10. An apparatus configured to predict road debris indicators, the apparatus comprising at least one processor and at least one memory storing computer program code, the at least one memory and the computer program code configured to, with the processor, cause the apparatus to at least:
    obtain image data of at least one navigable link;
    determine at least one road debris indicator based on the obtained image data, wherein the road debris indicator includes road debris classification data; and
    associate the determined road debris indicator with one or more navigable links to update a map layer of a geographic database.

11. The apparatus according to claim 10, wherein the at least one memory and the computer program code are further configured to, with the processor, cause the apparatus to receive an indication of a location of a vehicle, and wherein the at least one memory and the computer program code are configured to, with the processor, cause the apparatus to identify one or more road debris proximate the location of the vehicle.

12. The apparatus according to claim 11, further comprising determining a confidence interval associated with the determined road debris indicator location and updating a map layer with the confidence interval.

13. The apparatus according to claim 12, further comprising updating the confidence interval associated with the determined road debris indicator based at least in part on the severity of damage done to a vehicle by a determined road debris indicator.

14. The apparatus according to claim 13, wherein the at least one memory and the computer program code are configured to, with the processor, cause the apparatus to obtain the image data via a vehicle camera system.

15. The apparatus according to claim 14, wherein the at least one memory and the computer program code are configured to, with the processor, cause the apparatus to generate route guidance.

16. The apparatus according to claim 10, wherein the at least one memory and the computer program code are further configured to, with the processor, cause the apparatus to receive an indication of a type of vehicle, and wherein the at least one memory and the computer program code are configured to, with the processor, cause the apparatus to identify one or more road debris proximate the location of the vehicle which pose a risk to the type of vehicle.

17. A user interface for providing a user with a route to a destination, comprising the steps of:
    receiving input upon a user device from the user that indicates a destination;
    accessing a geographic database to obtain data that represent roads in a region in which the user device is operating;
    determining a route to the destination by selecting road segments to form a continuous path to the destination; and
    displaying the determined route or portion thereof to the user,
    wherein the determined route avoids at least one road segment in response to a road debris indicator.

18. The user interface of claim 17, wherein the route determined avoids one or more road debris indicators proximate to a vehicle based on vehicle type.

19. The user interface of claim 17, wherein the user interface is displayed on an end user device.

20. The user interface of claim 17, wherein the user interface is displayed in a motor vehicle.

\* \* \* \* \*